United States Patent [19]

Butts

[11] 4,380,698

[45] Apr. 19, 1983

[54] MULTIPROCESSOR CONTROL BUS

[75] Inventor: Orville R. Butts, West Lafayette, Ind.

[73] Assignee: Roper Corporation, Kankakee, Ill.

[21] Appl. No.: 172,408

[22] Filed: Jul. 25, 1980

[51] Int. Cl.³ .............................................. H05B 1/02
[52] U.S. Cl. ................................. 219/492; 364/477; 364/132; 219/486; 219/10.55 B
[58] Field of Search ................. 219/10.55 B, 492, 485, 219/486, 501, 506, 10.55 R; 364/101, 102, 477, 400; 340/309.4

[56] References Cited

U.S. PATENT DOCUMENTS

| Re. 29,685 | 6/1978 | Nabi | 364/900 |
| 3,974,402 | 8/1976 | Gould | 219/10.55 B |
| 3,982,097 | 9/1976 | Seider et al. | 364/102 |
| 4,100,597 | 7/1978 | Fleming et al. | 364/102 |
| 4,131,786 | 12/1978 | Cooper | 219/10.55 B |
| 4,251,858 | 2/1981 | Cambigue et al. | 364/102 |

Primary Examiner—M. H. Paschall
Attorney, Agent, or Firm—Leydig, Voit, Osann, Mayer & Holt, Ltd.

[57] ABSTRACT

A control arrangement for a multifunction appliance such as a cooking appliance wherein the control activity is distributed among a plurality of microprocessor based control circuits. In the exemplary embodiment each control circuit is associated with a different function of the appliance. The circuits are physically separated from one another and communicate on data bus lines. Due to the high transient conditions in such an appliance, the communications are in accordance with a redundant protocol to substantially eliminate erroneous data communication. The data bus protocol is devised such that deletion, addition and replacement of control circuits in a system, even to the point of substituting a circuit containing a different type of processor, is possible.

12 Claims, 14 Drawing Figures

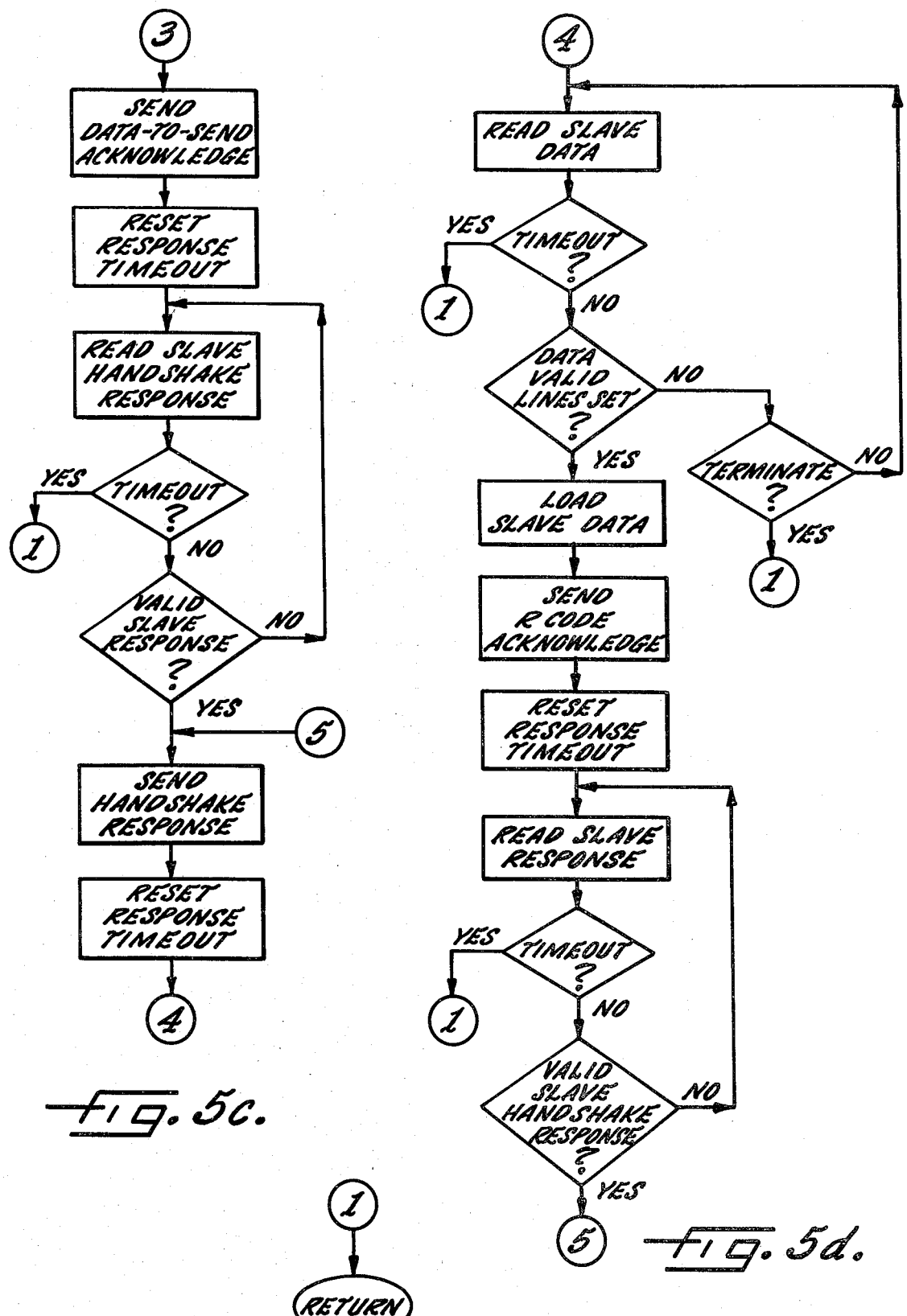

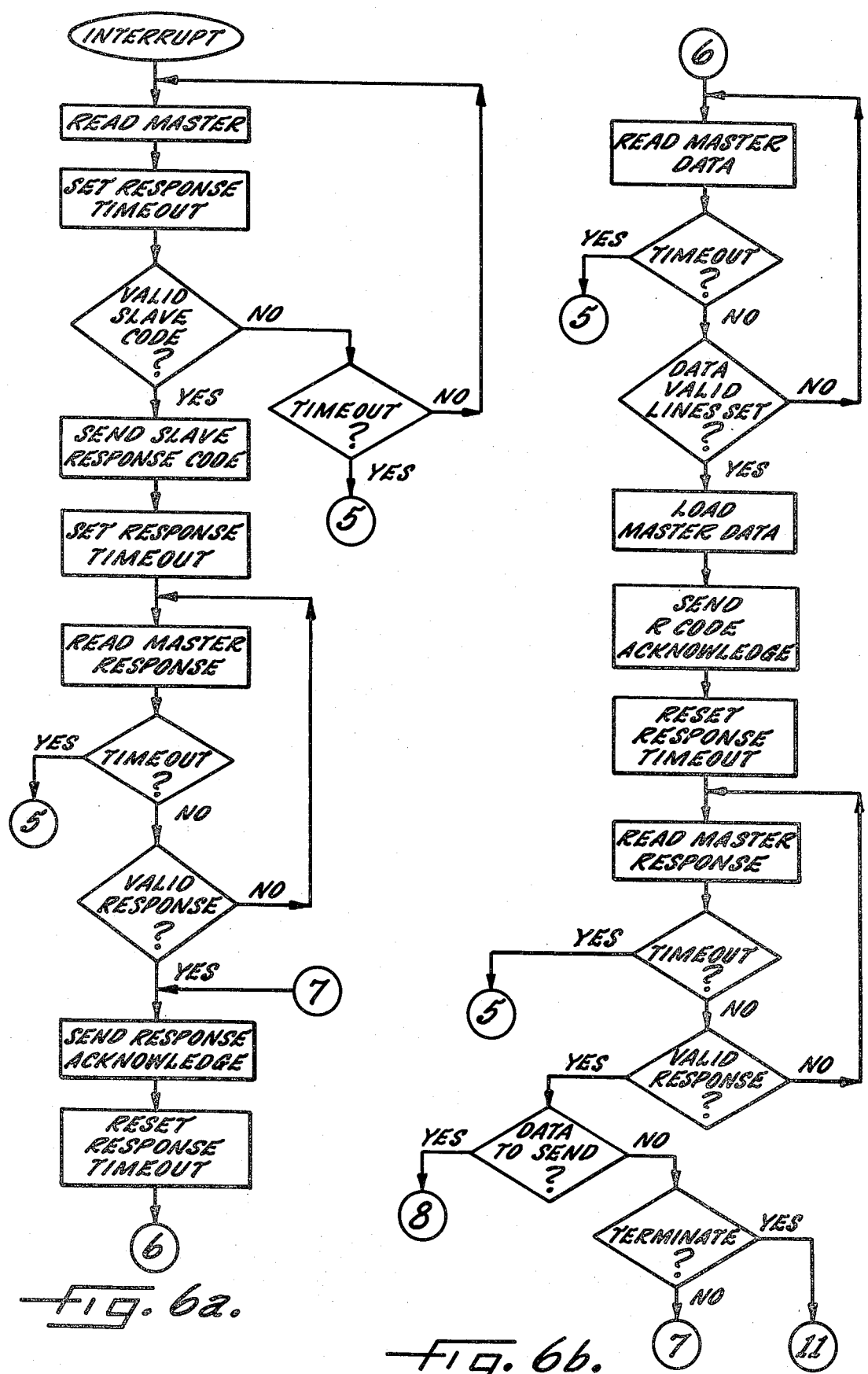

MULTIPROCESSOR CONTROL BUS

DESCRIPTION OF THE INVENTION

The invention relates generally to control arrangements for appliances, and more particularly concerns a distributed processor type of control with communication among the control processors on bus lines in accordance with a protocol.

As electro-mechanical controls for consumer appliances have given way to microprocessor-based controls, increased sophistication has been available both at the user-control system interface and also in the internal working of the control system. In a single function cooking appliance, for example a microwave oven, the control interface for the user might include a group of keys and a small display both of which interact with a single microprocessor-based control module in a control section of the appliance.

In developing a control system for a multi-function appliance, which might also have a plurality of stations or positions, space and cost limitations prohibit providing a separate key pad, display and control interface for each appliance function, with an associated microprocessor-based control. One large monoprocessor control arrangement with a single control panel is rigid in design in that it must be redesigned for each different, or subsequent, combination of appliance functions. Another approach, which may utilize a single control panel, is distributed processor control. In order to distribute the processing functions for the control activity, communication is required among a plurality of microprocessor-based control circuits and the user-control interface arrangement.

In the appliance environment there are generally high levels of electrical interference such as from switching transients and the operation of motors. It would be impossible using conventional interprocessor bus techniques to cost effectively link distributed control processors from various locations in the multi-function appliance. The alternative of combining the distributed control for ease of internal communication has the aforementioned problems of rigidity of design.

For a multi-function cooking appliance, which might include a four-burner range and a combination conventional/microwave oven cooking cavity, with several cooking functions associated with the oven, there is a need for a reasonably sophisticated control arrangement. In order to add flexibility of design and redesign of the control there are advantages to a distributed processor control, preferably with a portion of that distributed control processing associated with a single control panel. However, conventional interprocessor bus communication methods, such as those compatible with IEEE standard 488 and similar methods, are not appropriate in the high transient low cost, appliance environment. If the control intelligence of the control system is divided into distributed sections or modules, which may correspond to the functions of the appliance, and an appropriate mode of communication amongst the control modules established, it would be possible to add, delete, or change individual control modules without disrupting the balance of the control system. In this manner, appliance variations from model year to model year, and from the top of a model line to the bottom, may be provided while minimizing the extent to which inventories of control system devices must be maintained, for manufacturing and replacement parts.

It is consequently an object of the present invention to provide a low cost distributed processing microprocessor-based control system, having an interprocessor bus communication protocol which is operational in the high transient conditions of appliances and operable to adapt to variations in the number and type of processor based control circuits in a distributed processing control system.

It is a related object of the present invention to provide such an appliance control arrangement wherein microprocessor-based portions of the control arrangement utilizing different microprocessor types are readily compatible with one another for communication on a bus.

Further objects and advantages of the invention shall be apparent upon reading the following detailed description and upon reference to the drawings, in which.

Figures 5A, 5B:
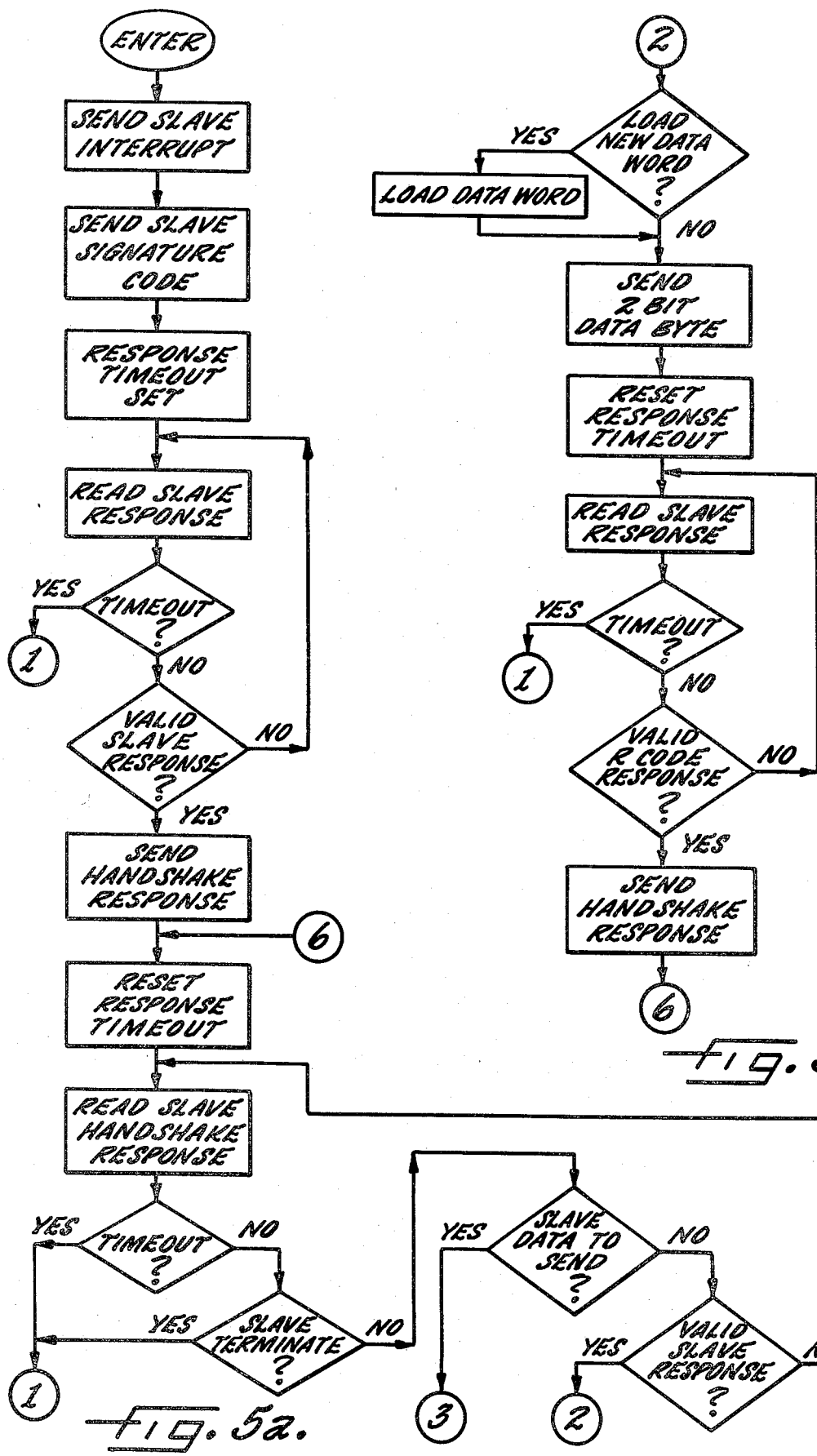
Figure 6C:
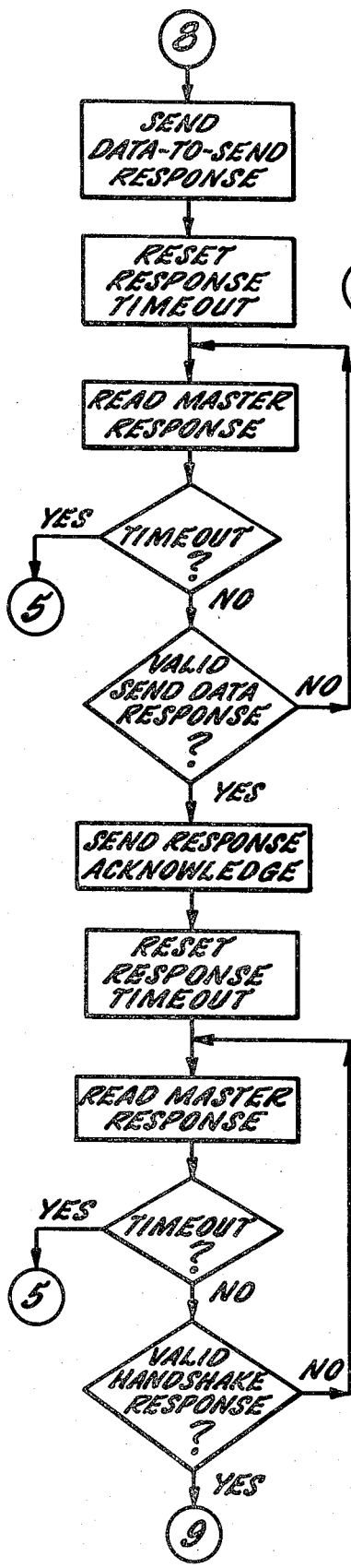
Figure 6D:
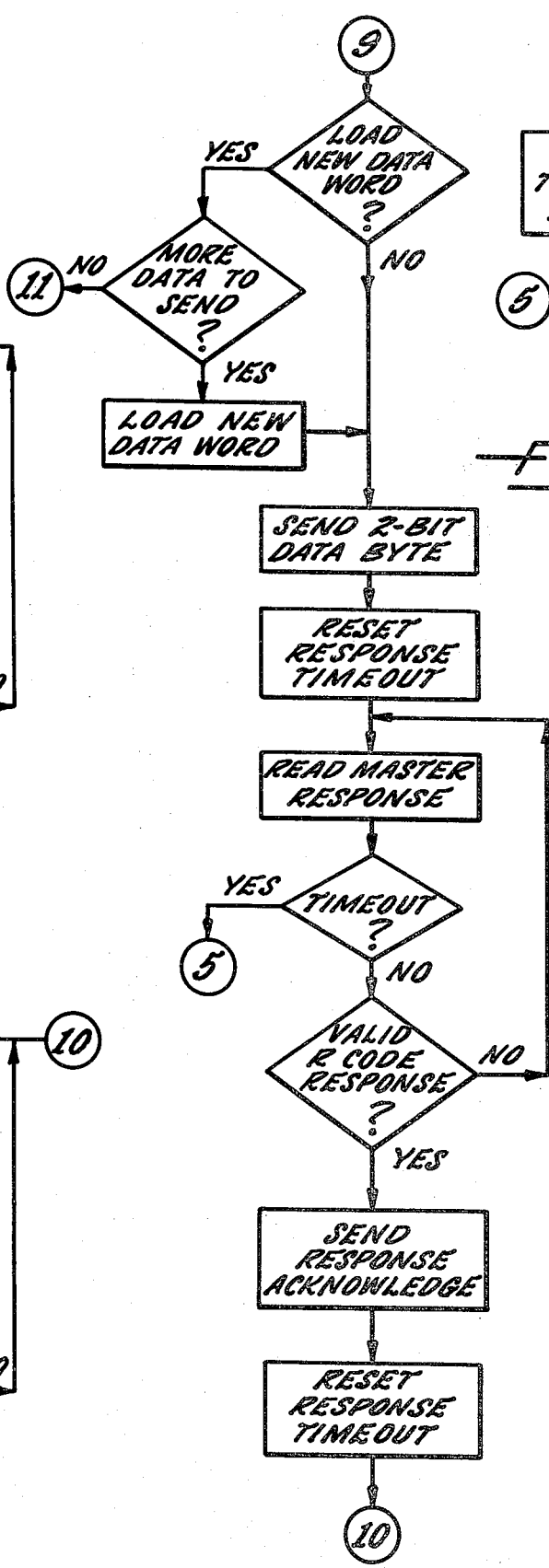
Figure 6E:
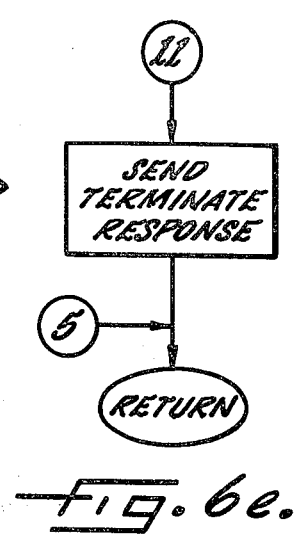

FIG. 5, the collective designation of FIGS. 5a–5e, is a flow chart of the sequences of operation of the master processor in communication with a slave processor; and FIG. 6, the collective designation of FIGS. 6a–6e, is a corresponding flow chart of the corresponding operation of a slave processor.

While the invention is susceptible to various modifications and alternative forms, a specific embodiment thereof has been shown by way of example in the drawings and will herein be described in detail. It should be understood, however, that it is not intended to limit the invention to the particular form disclosed, but, on the contrary, the intention is to cover all modifications, equivalents, and alternatives falling within the spirit and scope of the invention as defined by the appended claims.

Figure 1:
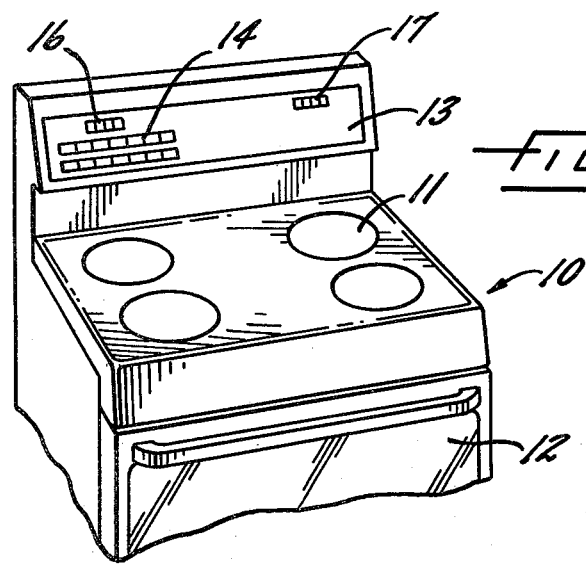
FIG. 1 is a perspective view of a portion of a multi-function cooking appliance including the control panel therefor.

With initial reference to FIG. 1, a multi-function cooking appliance 10 includes four surface heating elements, or burners, 11 and a combination thermal and microwave oven cooking cavity 12. Control information for the cooking appliance functions is entered through a control panel designated generally as 13, which includes a keyboard 14 and a digit display 16. The keyboard 14 includes keys for entering cooking function selections and settings such as for cooking times and temperatures, which may be displayed in the display 16. The control panel 13 also includes a burner display 17, which indicates the level of activation of each of the surface heating elements 11.

Figure 2:
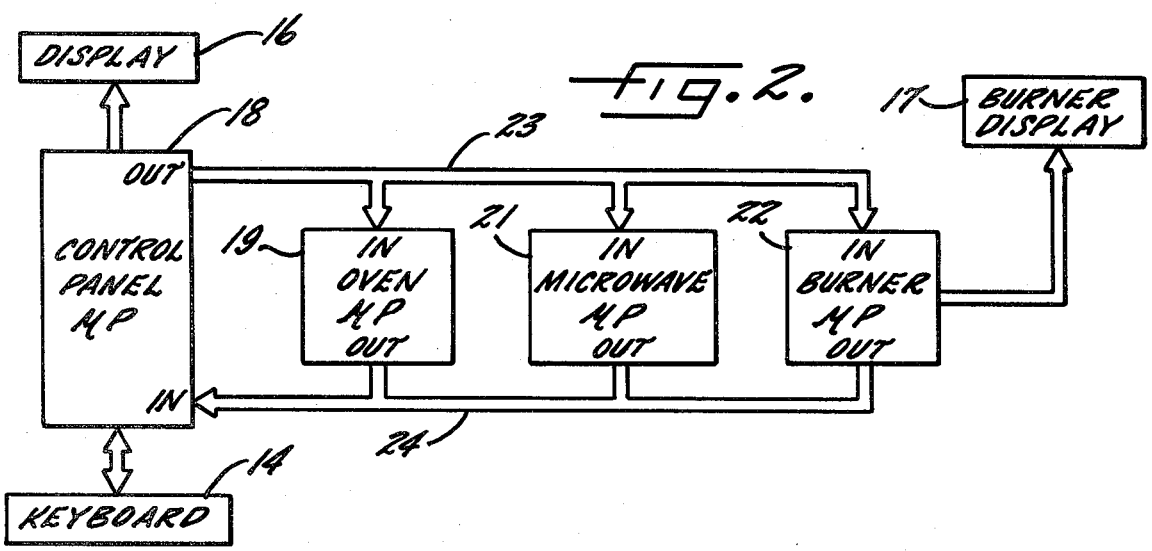
FIG. 2 is a block diagram of a distributed processor control arrangement for the appliance of FIG. 1.

Referring now to FIG. 2, and in accordance with the invention, the control circuitry for the appliance 10 includes a plurality of discrete microprocessor-based circuits linked by data bus lines. The control circuits are linked on the data bus lines through the use of a coded protocol and data transfer sequence to be described in detail hereinafter. For the cooking appliance 10 the control arrangement includes a control panel microprocessor circuit 18, thermal oven microprocessor circuit 19, a microwave microprocessor circuit 21 and a burner microprocessor circuit 22. Each discrete control circuit is primarily made up of a stored program microprocessor such as a Rockwell PPS-4/1 MM78 or an American Microsystems S-2000. The control panel microprocessor circuit 18 serves as the "master" processor in the exemplary system while the microprocessors 19, 21 and 22 are "slave38 processors. The significance of these designations will become apparent during the discussion of the manner in which data is communicated among the microprocessor circuits. Suffice it to say for now that the master processor addresses the slave processors to initiate data transfer between the master and an addressed slave.

The control panel processor circuit 18 interfaces with the keyboard 14 and the display 16 on the control panel 13 (FIG. 1) through appropriate drivers or other interface circuits. Similarly, the burner microprocessor circuit 22 drives the burner display 17. The exchange of data between control processors and a keyboard and displays may be accomplished using conventional techniques and does not form part of the present invention. Consequently, such data exchange techniques between control panel elements and the control system will not be described in detail. A system for such control data exchange is described in terms of an exemplary single processor control system in commonly assigned U.S. patent application Ser. No. 172,252, entitled Prompting Control, filed on even date herewith, now is U.S. Pat. No. 4,341,197.

In the illustrated control arrangement, the control panel microprocessor circuit 18 receives control information from the keyboard 14 and in response to that information, when appropriate, activates the display 16. For example, if a cooking temperature for the oven 12 is entered through the keyboard 14, the processor circuit 18 displays that temperature for a period of time in the display 16. While monitoring information received from the keyboard 14, the control panel processor 18 outputs an identification code for one of the slave processors on an output bus 23, followed by a sequence of coded information indicating the current control status. The information is available at the inputs of all of the slave processors. The slave processor whose address corresponds to the identification code written by the processor 18 reads the portion of the message which is relevant to that slave processor circuit and appropriately acts upon that data such as to control its associated cooking function. After receiving data from the master processor on the bus 23, the addressed slave processor may output coded information for the master processor 18 on a master processor input data bus 24. The bus 23 shall be referred to herein as the output bus and the bus 24 as the input bus, both references being taken with respect to the master processor and the direction of data flow relative thereto. The control panel microprocessor circuit 18 responds to information from a slave processor, such as by appropriately activating the display 16 or relaying information to one of the other slave processors in a subsequent information output on the bus 23.

Preferably, the same coded data sequence is output by the control panel processor circuit on the bus 23 regardless of which slave processor is addressed. In this way, the individual slave processor circuits may be different for different appliance models or for subsequently improved appliances. The control information for more sophisticated processor circuits is available on the bus 23, during each master data transmission, but excess data may be ignored by a less sophisticated slave processor circuit. Thus, for example, when the burner microprocessor 22 is addressed, it may disregard the first three data words from the control panel processor, such data words being generally reserved for oven or microwave information, and read only data words four and five. A different burner microprocessor module might continue to read data words six and seven, which contain additional burner information, which information the module 22 is not able to utilize. For example, the appliance 10 has four burners 11, and the control panel module 18 may be capable of outputting information for six burners. The control information for the fifth and sixth burners would be ignored by the module 22 but recognized by a more sophisticated slave module in a six burner appliance.

Figure 3:
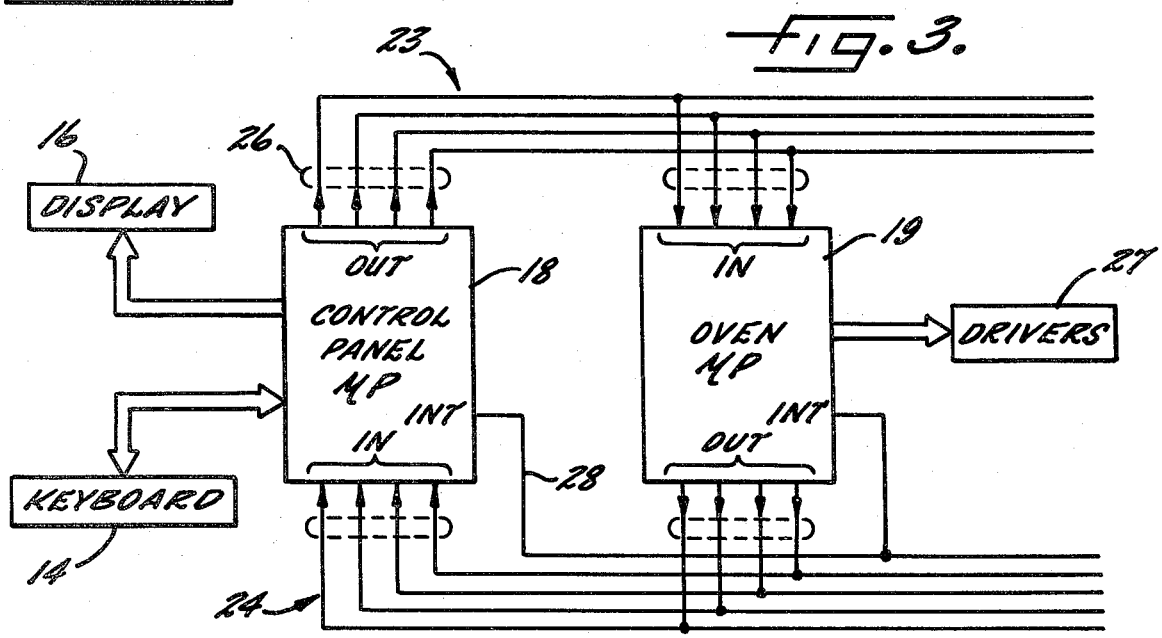
FIG. 3 is a more detailed illustration of an exemplary pair of microprocessors from FIG. 2, showing the lines of the interconnecting bus arrangement for the processors.

Referring now to FIG. 3, the data bus lines for the control panel microprocessor 18 and oven microprocessor 19 are shown in more detail. The connections to the buses for the other slave processors are the same as those for the oven microprocessors, and therefore only the exemplary oven slave processor connections have been shown. For the exemplary control processor arrangement shown, four output data lines, comprising the bus 23 from the control panel microprocessor circuit 18 are connected to the oven microprocessor 19 and the other slave microprocessors is parallel. Similarly, there are four input lines, comprising the data bus 24 to the master processor circuit 18 from the slave microprocessor circuits, also connected in parallel. In communicating with the slave processors, the master processor 18 initiates data transfer by signalling the slave processors on an interrupt line 28. This interrupt line 28 is also connected in parallel to each of the slave processors. Following a protocol to be discussed hereinafter, the master processor 18 addresses a slave processor and places data on the bus 23. At the end of data transmission by the master processor, the addressed slave processor may return data on the bus 24. Conventional signal ground, power supply ground, and power supply voltages (not shown) are also provided for the processor circuits. Preferably, any possibly needed supply voltage is made available at each processor control circuit location so that a required supply voltage is present for whatever particular type of processor is being used.

The master and slave processor modules are programmed to accept and write out data in a manner which is compatible with the protocol format of the bus arrangement. The sequence of handling the control data by both the master microprocessor and a slave microprocessor will be described hereinafter by way of flow charts. The particular internal software interfacing with the bus for a particular manufacturer's type of microprocessor is within the ambit of ordinary skill in microprocessor chip design. Given a particular data transmission format such as in the present case, such software interfacing is basically a chip vendor detail and shall not be described herein for a particular type of processor. The only likely hardware interface between one of the microprocessor circuits and one of the buses is a bus voltage interface circuit such as 26, shown in dotted lines in FIG. 3. An interface circuit 26 merely serves to convert the voltage level of the bus signals to a voltage level compatible with the particular processor being used in a processor control circuit, if such conversion is necessary.

Figure 4:
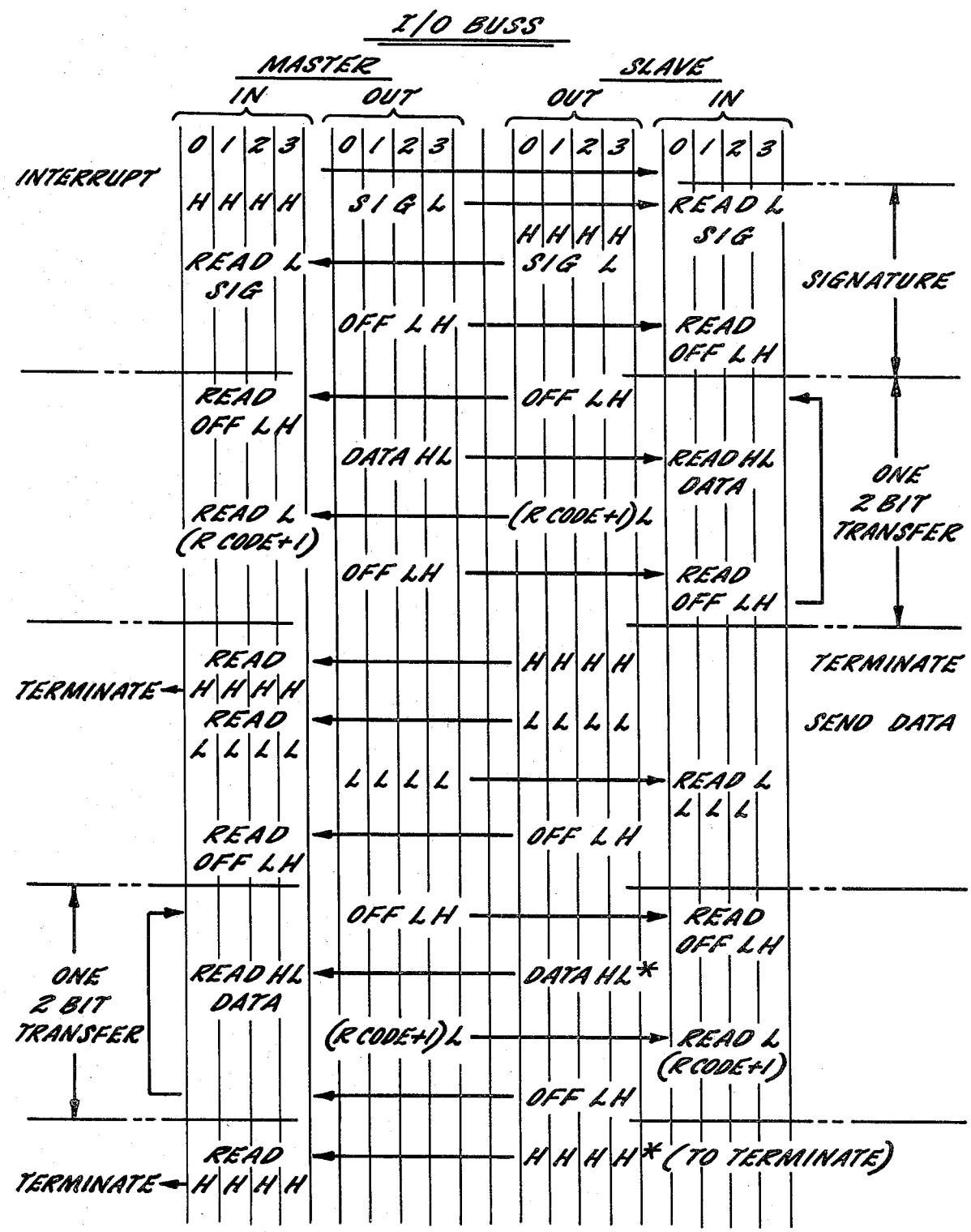
FIG. 4 is a state diagram of the data line conditions during communication between an exemplary master processor and a slave processor in the control system.

Referring now to FIG. 4, the conditions of the lines of the input and output buses 23 and 24, and of the interrupt line, are shown in detail for the exchange of data between the master processor circuit and a typical one of the slave processor circuits. For example, the Figure might illustrate the manner in which the master microprocessor circuit 18 would exchange data with the slave microprocessor circuit 19 for the oven control. In FIG. 4, the four ports labelled 0, 1, 2 and 3 for the input to the master processor are coupled to be similarly labeled output ports of the slave processor by the four lines of the bus 24 (FIG. 3). Likewise, the four output ports for the master processor are coupled to the four input ports of the slave processor by the four lines of the bus 23 (FIG. 3).

In the illustrated protocol arrangement, the master processor places a sequence of two bit bytes of control information on the output bus 23 after addressing one of the slave processors, which receives and loads the data. After the master processor has transmitted data, the addressed slave processor writes data, if any, to the master processor on the input bus 24. Each transfer of information between the master processor and the slave processors is generally preceded by an appropriate handshake protocol in order to assure that erroneous data is not received.

In the present instance the master processor places the same sequence of data words onto the bus regardless of which slave processor is being addressed. As previously mentioned this technique enhances expandability of the system since different slave modules serving the same appliance function may use more or less of the available data which is placed onto the bus by the master processor. In operation, the master processor begins to place the same sequence of data onto the output bus after addressing a particular processor. When an addressed slave processor has received a number of data words of control information which equals the maximum amount of data the processor is operable to use, the slave processor may effect the termination of the master's transmission. Otherwise the master processor will complete full data transmission. In any event, after master data transmission, the slave may return data to the master. Upon termination of communication between the master processor and the addressed slave processor, the master processor proceeds to address the next slave processor and sequentially advances to address each of the slave processors returning to the first processor addressed and continuing in like manner.

With reference to FIG. 4, the master processor initiates communication with a particular slave processor by placing an interrupt signal on the interrupt line 28 (FIG. 3). In the illustrated example, the input ports of the master processor are at this time held high by the slave processors. Simultaneously with the generation of the interrupt signal by the master processor, a low is placed on line 3 and a slave address signal on lines 0, 1 and 2 of the output bus 23. Upon receiving the interrupt signal all of the slave processors read the signal from the master processor on the output bus at their input ports. The slave processors read the low on line 3 and the address signal on lines 0, 1 and 2. The addressed slave processor then outputs its address and the low on line 3 to the master processor, which reads the address to confirm that contact has been made with the proper slave microprocessor.

In order to more definitely prevent erroneous communications, a confirmation, or handshake, signal is sent from the master processor to the slave processor which has been addressed. At this time only the addressed slave microprocessor is reading the signals on the output bus, while the unaddressed slave processors have returned to executing the control function routines for their particular cooking function. The addressed slave processor reads the handshake signal, which in the illustrated example consists of lines 0 and 1 being off, or not considered, and lines 2 and 3 being low and high, respectively. The receipt by the slave processor of this handshake signal completes the signature phase of communication.

The slave processor initiates the sequence of the transfer of one two bit byte of control information by sending the handshake signal back to the input of the master processor, which reads it. The master processor then outputs the first two bit byte of a data word on the lines 0 and 1, together with a high on line 2 and a low on line 3. This high-low accompanying the data is to further decrease the chance of erroneous data being received and read. The slave processor then reads the data after recognizing the high on line 2 and the low on line 3. The slave processor then returns a response code on lines 0, 1 and 2 together with a low on the line 3. This response code is a binary representation of the numbers 1 through 6. The response code is incremented by the slave processor, and the expected response code is incremented by the master, with each data byte that is transmitted in order to further assure that all of the sequentially transmitted control information is correctly received. The response code begins at a binary one (0,0,1) and steps sequentially with each transmitted data byte in a binary six (1,1,0) and then returns to a binary one to begin another sequence. Typically, several data bytes will make up a data word and a data transmission will contain several words.

After the master processor receives the response code it compares it with its internally incremented response code to be sure that the slave processor has in fact received the proper information. If the response code is correct, the master processor sends the handshake signal to the slave processor, which reads it.

This completes the sequence for the transfer of one two bit byte of information from the master processor to the slave processor. Should the slave processor wish to receive another two bit byte of data, it again places the handshake signal on the bus to the master processor which initiates another two bit data byte transfer from the master processor to the slave processor.

If the slave processor has received all of the information which it needs, it may place its output ports, and hence the input lines to the master processor, all high, which will be read by the master processor as an indication to terminate further transmission. The master processor then proceeds to address the next slave processor.

Should the slave processor have data to send to the master processor, it places all of its output lines low. This low is then returned from the master to the slave which then responds with the handshake signal. Then the sequence of transferring a two bit byte of control data from the slave to the master processor begins. First, the master processor sends the handshake signal to the slave processor. The slave processor then returns the data byte together with the high and low on lines 2 and 3, respectively. The master processor recognizes the high and low on the lines 2 and 3 and reads the data. Then the master processor returns and increments a response code signal, together with a low on the line 3, to the slave processor, which reads the low and the response code. If the response code is correct, the slave processor then sends the handshake signal back to the master processor. Should the master processor wish to receive any further information from the slave processor, the master processor then transmits the handshake signal, re-initiating the subroutine for a two bit byte of data transfer. Should the slave processor wish to terminate transmission of information to the master processor, it places all of its output lines high, which is read by the master processor and communication is terminated. The master processor then sequences to address the next slave processor.

Referring now to FIG. 5, the operating routine for the master processor is shown in flow chart form. The flow chart of FIG. 5 corresponds to the operations described in regard to the illustration of the signal lines in FIG. 4. Between interrupts for communicating with the slave processors, the exemplary master processor, which is the control panel processor, updates the lights and displays and receives information from the keyboard in order to operate the control panel. On an interrupt basis, as described above, the master processor also communicates with the slave processors.

In beginning the routine for communicating with a typical slave microprocessor, the master processor sends the slave interrupt signal and the slave signature code for the slave processor then being addressed. The master processor then sets an internal timeout sequence as it waits for a response from the addressed slave processor. The timeout intervals discussed herein are on the order of milleseconds, setting slow enough response times to be compatible with practically any available type of processor. If a correct response is not received within the timeout interval, the master processor will return to its background operations with the control panel and then proceed to address the next slave processor. After setting the response timeout, the master process continues to read its input lines checking for a valid slave response.

If a valid slave response is received, the master processor sends the handshake response to the addressed slave processor. The master processor then resets the timeout and reads the input lines for the slave handshake response. Again, if timeout occurs, the master processor returns to background functions. Until timeout does occur, the master processor input lines are read to determine if a slave terminate or other valid signal has been received. If a slave terminate signal is received, the master processor returns to background processing. If a slave terminate signal is not received, then the input lines are checked to see if the slave has sent a signal indicating that there is data to be sent from the slave to the master processor.

If the slave processor signal indicates that the slave wishes to send information, then the master processor proceeds to the slave data transfer subroutine beginning in FIG. 5c which shall be described subsequently. If a valid slave handshake response is received, the master processor checks to see if a new data word, which will comprises several two bit bytes of data, needs to be loaded in an internal memory register to be subsequently written onto the output lines (FIG. 5b). The next data word is loaded if necessary, and then the next two bit data byte is placed on the master processor output bus.

Again, the timeout period is reset and the master processor waits to read the response code from the slave processor. If a valid response code is received before timeout, the master processor sends the handshake protocol to the slave processor, ending the two bit data byte transfer subroutine. The master processor then resets the response timeout (FIG. 5a) and reads its input lines for the next slave response, typically a handshake response, but possibly a terminate or slave data send command. If a handshake response is received from the slave processor within the timeout interval, the master processor sends another two bit data byte, after loading a new data word if necessary. The master processor will continue executing the transmission subroutine until the slave processor terminates data transmissions with a terminate or slave data to send response, or until all data is transmitted.

As will be recalled, when the slave microprocessor has data to send to the master processor and no longer wishes to receive data, the slave processor writes a low to all four of its output data lines which is received by the master processor. Thus, at the decision point in FIG. 5c labelled SLAVE DATA TO SEND?, if the master receives all low inputs on its input bus, as its next step the master processor acknowledges the data line low outputs from the slave processor by sending all of its output lines low (FIG. 5c). The master processor then resets its response timeout and waits for and reads the slave handshake response. The master processor answers the slave handshake with an answering handshake signal, resets the response timeout and reads the first data byte from the slave processor. If the data lines 2 and 3 are properly set indicating valid data is being received, the master processor will load the data byte from the slave. If a terminate signal is sent by the slave processor, all data lines high, the master processor then terminates and returns to its background functions.

When the data valid lines are properly set, and the master processor loads the first two bit byte of slave data from the data bus, it then sends a response code acknowledgement which is incremented by one as discussed earlier in regard to sending the response code from the slave to the master. The master processor then resets its response timeout and reads the slave response to the response code acknowledgement just sent. If a valid slave handshake response is received before the timeout period, the master processor returns the handshake to the slave processor and returns to the just-described subroutine for reading another two bit byte of slave data.

Referring now to FIG. 6, the flow chart for data communication by a typical slave processor is shown. Beginning, in FIG. 6a, with the receipt of an interrupt signal on the interrupt line, the slave processor reads the data lines of its input bus for the code sent by the master processor. The slave processor then sets its response timeout and checks to see if its particular code is on the data lines. If the slave processor does not recognize its address code within the response timeout period, the slave processor returns to its control functions since it has not been properly addressed.

If the slave processor has been addressed by the master, it responds with its address code and sets another timeout interval waiting for the master processor response. If it receives the master processor handshake response, it answers with a handshake response and sets its response time out again.

The slave processor then reads the data from the master processor (FIG. 6b), and if the data valid lines are properly set the slave processor loads the data from the master into its memory. If the data valid lines are not set, the slave processor times out and leaves the routine. After the master data has been loaded, the slave processor sends a response code signal (binary one to six), increments the code, and sets another response timeout period.

If the master processor answers with the handshake response before the timeout period, the slave processor determines if it now has data to send to the master. If the slave processor now wishes to send data, it proceeds to the send data routine, to be described hereinafter. If the slave processor does not at that point wish to send data, it may either terminate communication with the master processor or receive another two bit byte of control data. If the slave processor wishes to receive further data from the master processor, it returns to the SEND RESPONSE ACKNOWLEDGE block (FIG. 6a), and sends the handshake response to indicate to the master processor that it wishes to receive another two bit byte of data. If the slave processor does wish to terminate receiving data from the master processor, and has no data to transmit, it sends the terminate response (all lines high) and returns to its control functions.

In order to send data back to the master processor, the slave processor sends the DATA-TO-SEND response, all data lines low (FIG. 6c). The slave processor then resets the response timeout and waits for the master processor to acknowledge by sending all of its output ports low. If the valid "send data" response is received from the master processor, the slave processor then exchanges the handshake signal with the master processor and determines if the slave needs to load a new data word.

If a data word is not already loaded for transmission, the slave processor attempts to load a new data word. If there is no more data to send, then the slave processor sends the terminate response and returns to its own control function processing. If there is another data word to be loaded by the slave processor, it loads that data word. The slave then sends the first two bit data byte of the currently loaded data word. The slave processor then waits within another timeout period to determine if a valid response code has been returned by the master processor. If so, the slave processor acknowledges with the handshake code and resets the response timeout. The slave processor then returns to the READ MASTER RESPONSE block (FIG. 6c) and reads the input lines for a valid handshake response from the master processor. If the handshake is received within the timeout period it indicates that the master processor is ready to accept another two bit data byte.

As indicated above, once all of the data words stored by the slave processor for transmission to the master processor have been sent, the slave processor terminates transmission. If at any time the master processor does not wish to receive further data messages, it will fail to return the handshake signal and the slave processor will time out.

While the present control arrangement has been described in terms of four bit microprocessors, the principles disclosed are equally applicable to other microprocessors such as eight or sixteen bit microprocessors. Similarly, the number of distributed microprocessor control circuits may be expanded beyond that illustrated.

What is claimed is:
1. A cooking appliance having a plurality of cooking functions performed within a single appliance cabinet including a distributed control arrangement comprising:
 (a) a plurality of microprocessor-based control circuits each associated with a different portion of the appliance control, and each physically located within the appliance cabinet but physically located on different printed circuit boards;
 (b) a multi-line bus arrangement coupling the control circuits to one another, each said control circuit including means for exchanging control information with another said control circuit via the bus, each said control circuit also including means for preventing exchange of invalid data resulting from noise on the bus; and
 (c) a user-control system interface physically connected to and in close proximity with the appliance cabinet for manual entry of cooking control data by the user, said interface being the sole source of user-supplied cooking control information,
 in which each microprocessor-based control circuit is associated with a different one of the plurality of cooking functions of the cooking appliance, and
 in which one of the microprocessor-based control circuits is a master circuit with the remainder of the circuits being slave circuits, the slave circuits being operable to transfer information onto the bus only in response to data placed on the bus by the master circuit.

2. A consumer appliance having a plurality of stations within a single appliance cabinet including a distributed control arrangement comprising:
 (a) a plurality of microprocessor-based control circuits each associated with a different portion of the appliance control, and each physically located within the appliance cabinet but physically located on different printed circuit boards;
 (b) a multi-line bus arrangement coupling the control circuits to one another, each said control circuit including means for exchanging control information with another said control circuit via the bus, each said control circuit also including means for preventing exchange of invalid data resulting from noise on the bus;
 (c) a plurality of control connections, one between each of the control circuits and an associated appliance station; and
 (d) a user-control system interface physically connected to and in close proximity with the appliance cabinet for manual entry of cooking control data by the user, said interface being the sole source of usersupplied cooking control information,
 in which each microprocessor-based control circuit is associated with a different one of the plurality of cooking stations of the cooking appliance, and
 in which one of the microprocessor-based control circuits is a master circuit with the remainder of the circuitsbeing slave circuits, the slave circuits being operable to transfer information onto the bus only in response to data placed on the bus by the master circuit.

3. A cooking appliance having a plurality of cooking functions performed within a single appliance cabinet comprising:
 (a) at least one cooking element activatable in response to control signals;

(b) a plurality of microprocessor-based control circuits each associated with a different one of said functions, each physically located within the appliance cabinet but physically loacted on different printed circuit boards, and each including means for producing and coupling control signals to a cooking element to perform the associated cooking function;

(c) a multi-line bus arrangement coupling the circuits to one another, each circuit including means for exchanging control information between the bus and the microprocessor of the circuit, each said control circuit also including means for preventing exchange of invalid data resulting from noise on the bus; and a user-control system interface physically connected to and in close proximity with the appliance cabinet for manual entry of cooking control data by the user, said interface being the sole source of user-supplied cooking control information, in which one of the microprocessor-based control circuits is a master circuit with the remainder of the circuits being slave circuits, the slave circuits being operable to transfer information onto the bus only in response to data placed on the bus by the master circuit.

4. A cooking appliance having a plurality of cooking functions performed within a single appliance cabinet comprising:

(a) at least one cooking element activatable in response to control signals;

(b) a plurality of microprocessor-based control circuits each associated with a different one of said functions, each physically located within the appliance cabinet but physically located on different printed circuit boards, and each including means for producing and coupling control signals to a cooking element to perform the associated cooking function;

(c) a multi-line bus arrangement coupling the circuits to one another, each circuit including means for exchanging control information between the bus and the microprocessor of the circuit, each said control circuit also including means for preventing exchange of invalid data resulting from noise to the bus; and (d) a user-control system interface physically connected to and in close proximity with the appliance cabinet for manual entry of cooking control data by the user, said interface being the sole source of user-supplied cooking control information, wherein a plurality of the microprocessors have an interrupt input for temporarily suspending background control processing and initiating an exchange of control information, and one of the lines in the multi-line bus arrangement is directly connected to the interrupt inputs of a plurality of the microprocessors, so that the exchange of control information to a plurality of the microprocessors may be initiated by an interrupt signal on the bus without interference with the control functions of the interrupted microprocessors, wherein a plurality of the lines of the bus interconnect a plurality of the microprocessor-based control circuits in a wired-OR fashion so that additional control circuits may be added to the bus in parallel merely by extending the lines of the bus, and wherein one of the microprocessor-based control circuits is a master circuit with the remainder of the control circuits being slave circuits, the slave circuits being operable to transfer information onto the bus only in response to data placed on the bus by the master circuit so that the master can insure that only the slave appropriates the bus at any given time.

5. The control system as claimed in claim 4, wherein the only interconnection between the microprocessor control circuits providing aperiodic initialization of data transfer is the interrupt line, and wherein all of the slave microprocessors have interrupt inputs connected to the interrupt line so that no hardware components external to the microprocessors are required for aperiodic initialization of data transfer.

6. The control system as claimed in claim 4, wherein a plurality of the microprocessors are of different types operative at different speeds, and the master circuit includes means for placing a recognizable address of one of the slave circuits on the bus at a slow enough speed dependent on the slowest microprocessor in the system so that all of the slave circuits may recognize the address, followed by control data at a speed being dependent upon the operating speed of the slower of the master microprocessor and the addressed slave microprocessor so that communication speed increases to a maximum possible rate after a particular slave circuit has responded to its address.

7. The control arrangement as claimed in claim 4, wherein the only hardware interface between a plurality of the microprocessor circuits and the bus are voltage interface circuits merely serving to convert the voltage level of the bus signals to a voltage level compatible with the particular processors being used, when such conversion is necessary.

8. The control system as claimed in claim 5, 6 or 7, wherein (a) the interrupt line is connected to the master microprocessor-based control circuit and is also connected to the slave microprocessor-based control circuit interrupt inputs and is periodically activated thereby interrupting the slave microprocessor-based control circuits in unison, (b) the lines in the multi-bus arrangement comprise a directional output bus connecting the output of the master microprocessor-based control circuit to the inputs of the slave microprocessor-based control circuits, and a directional input bus connecting the inputs of the master microprocessor-based control circuit to the outputs of the slave microprocessor-based control circuits, and (c) wherein said master and slave microprocessor-based control circuits are programmed to periodically exchange data bits over the directional bus lines coincident with the activation of the interrupt line.

9. The control system as claimed in claim 8, wherein no more than one data bit is exchanged over each directional bus line coincident with a single activation of the interrupt line, and the directional input bus and the directional output bus each has a plurality of lines, the group of data bits carried on the bus lines of each given direction and exchanged coincident with a single activation of the interrupt line forming a code word, the set of code words comprising recognizable distinct (a) slave signature codes designating particular slave microprocessor-based control circuits, (b) data-byte codes designating parameters used by the slave microprocessor-based control circuits in executing their respective control functions, and (c) bus control codes for controlling the exchange of slave signature codes and data-byte codes over said input and output directional bus lines.

10. The control system as claimed in claim 9, further comprising means for said master microprocessor-based control circuit to establish communication exclusively with a single, desired slave microprocessor-based control circuit, said means comprising:

(a) means for the master transmitting a unique predetermined slave signature code corresponding to the desired slave over the output bus to the slave microprocessor-based control circuits, (b) means for each slave available for communication with the master receiving and comparing said slave signature code to a predetermined stored signature code corresponding to the particular slave, (c) means for echoing the slave signature code via the input bus back to the master if the received and stored signature codes match and if the slave is available for communication with the master, and (d) means for the master receiving and comparing the code on the input bus to the signature code previously transmitted in step (a), so that both the master and the desired slave know that communication is established by the matching of the slave signature codes.

11. The control system as claimed in claim 10, further comprising means for confirming the transmission and reception of a code word over a directional bus comprising:

(a) means for echoing the transmitted code word, (b) means for comparing the echoed code word to the originally transmitted code word, (c) means for transmitting a confirmation bus control code if the comparison in step (b) indicates a match, and (d) means for echoing the confirmation bus control code, so that both the master and slave microprocessor-based control circuits know, by the receipt of the confirmation bus control code, that the transmitted code word has been correctly received.

12. The control system as claimed in claim 10, wherein each microprocessor-based control circuit further comprises a response control code register and further comprising means for acknowledging the receipt of a transmitted data-byte code comprising:

(a) means for resetting the response control code registers in the master and a desired slave to a predetermined initial response control code when communication between the master and the desired slave microprocessor-based control circuits is first established, (b) means for changing the contents of the response code registers in a predetermined fashion upon the transmission and reception of a data-byte code, (c) at the data-byte receiving microprocessor-based control circuit, means for transmitting the changed contents of the response code register upon the reception of the data-byte code, and (d) at the data-byte transmitting microprocessor-based control circuit, means for receiving and comparing the transmitted changed response code to the changed contents of the response code register, so that a match indicates acknowledgment of receipt of the transmitted data-byte code.

* * * * *